United States Patent [19]
Challberg et al.

[11] Patent Number: 5,850,424
[45] Date of Patent: Dec. 15, 1998

[54] REFUELING MACHINE WITH RELATIVE POSITIONING CAPABILITY

[75] Inventors: Roy Clifford Challberg, Livermore; Cecil Roy Jones, Saratoga, both of Calif.

[73] Assignee: General Electric Company, Schenectady, N.Y.

[21] Appl. No.: 631,496

[22] Filed: Apr. 12, 1996

[51] Int. Cl.⁶ .................................................. G21C 19/10
[52] U.S. Cl. ........................... 376/271; 376/248; 376/258
[58] Field of Search ..................................... 376/248, 258, 376/264, 268, 270, 271

[56] References Cited

U.S. PATENT DOCUMENTS 3,253,995   5/1966   Antonsen et al. ...................... 376/271

*Primary Examiner*—Daniel D. Wasil
*Attorney, Agent, or Firm*—Armstrong, Teasdale, Schlafly & Davis

[57] ABSTRACT

A refueling machine having relative positioning capability for refueling a nuclear reactor. The refueling machine includes a pair of articulated arms mounted on a refueling bridge. Each arm supports a respective telescoping mast. Each telescoping mast is designed to flex laterally in response to application of a lateral thrust on the end of the mast. A pendant mounted on the end of the mast carries an air-actuated grapple, television cameras, ultrasonic transducers and waterjet thrusters. The ultrasonic transducers are used to detect the gross position of the grapple relative to the bail of a nuclear fuel assembly in the fuel core. The television cameras acquire an image of the bail which is compared to a pre-stored image in computer memory. The pendant can be rotated until the television image and the pre-stored image match within a predetermined tolerance. Similarly, the waterjet thrusters can be used to apply lateral thrust to the end of the flexible mast to place the grapple in a fine position relative to the bail as a function of the discrepancy between the television and pre-stored images.

18 Claims, 9 Drawing Sheets

REFUELING MACHINE WITH RELATIVE POSITIONING CAPABILITY

GOVERNMENT RIGHTS STATEMENT

The Government of the United States of America has rights in this invention pursuant to Contract No. DE-AC03-90SF18494 awarded by the U.S. Department of Energy.

FIELD OF THE INVENTION

This invention relates generally to systems for refueling a reactor. In particular, the invention relates to refueling bridges which have a telescoping mast suspended therefrom and an end effector mounted on the end of the mast for grappling reactor fuel or a component of the reactor and transporting it to the spent fuel pool or other suitable location.

BACKGROUND OF THE INVENTION

Typical refueling platforms consist of a rigid bridge crane type structure that travels on rails in the X direction between the reactor well and the spent fuel storage pool. A trolley, also a rigid structure, rides on rails on the bridge crane horizontal box section beams for motion in the Y direction. Located on the trolley are: 1) a telescoping mast and related equipment; 2) an auxiliary hoist with controls; and 3) a control station with displays. The refueling platform structure in Europe and Japan is of sufficient stiffness, the installation of the rails of sufficient accuracy, and a drive train of sufficient tightness to possibly enable automatic grappling of the fuel based on coordinate sensors. But the stiffness required for automatic grappling makes the platform structure extremely heavy, which reduces its speed of travel. The platform structures in the United States are not as stiff, which makes automatic grappling of the fuel based on coordinate sensors impossible.

In refueling systems of the foregoing type, the telescoping mast is attached to the trolley with gimbals. The mast consists of an outer heavy-wall precision-machined tube attached to the refueling machine at its top and four nested heavy-wall precision-machined tubes within. The mast has a rigidly positioned flanged adapter designed to accommodate several different end effectors. The mast extends in a manner similar to that of a telescope for a distance of about 17 m below the refueling floor.

Fuel assemblies can only be moved and replaced while the reactor is shut down. The cost of a reactor outage can be reduced by decreasing the time required for refueling. Since moving fuel is highly repetitive, it is an ideal target for automation. Although control systems for automation are readily available, refueling machines with their telescoping mast and grapple are not sufficiently free of lost motion to permit repeatable positioning accuracy and reliability needed for automation. Or if they are sufficiently free of lost motion, they are extremely stiff and therefore heavy structures which require low speeds.

All current refueling machines utilize absolute positioning to achieve a predetermined repeatable Cartesian coordinate set in the horizontal (X-Y) plane. This concept has several undesirable characteristics and limitations, principally in relation to the cost of achieving the necessary position accuracy for a given depth of the fuel.

In absolute positioning, the position of the fuel in the core is assumed to have a fixed position relative to a corresponding position on the rail of the bridge or the rail of the trolley. Also a fixed invariant distance to the grapple and its intended final location is assumed. For this reason, the design must minimize deflection, minimize looseness in the mast, and eliminate lost motion in the drive trains. In a typical refueling machine with absolute positioning capability, the grapple X and Y coordinates are obtained from position indicators (typically optical digital encoders) located near the platform and trolley rails. The bridge and trolley are moved to the desired position and the mast with its grapple is lowered to the level of the fuel in the core. In this concept, deflections and clearances need to be minimized. Consequently, the bridge and trolley structures are designed to be very rigid and are therefore massive structures. Because of the large mass, a small amount of lost motion or stored energy in the drive train becomes a source of position error and it is difficult to eliminate this error source entirely. There is the inherent difficulty of precisely positioning a large mass. In addition, speed of travel from position to position becomes a problem from the standpoint of controlled nonlinear rapid acceleration and deceleration.

A separate problem is the telescoping mast and grapple design. The conventional telescoping mast is a series of nested tubes that extend by sliding relative to each other like a telescope. The mast must be very stiff and must be precisely machined to minimize the clearance between tubes. Consequently, the conventional mast is quite heavy. For a mast weighing 1070 kg, the estimated cable load (with fuel) is about 950 kg. For this weight, each cable must be about 9 mm in diameter and with a drum diameter of at least 405 mm (i.e., 45 times the cable diameter).

For the mast, the design challenge is to minimize clearances between the tubes and simultaneously assure smooth motion as the mast extends. If the bearing clearances are set too tight, the result is stick-slip, which is described as follows. As the mast is being extended, one of the sections is supported by the friction of the bearing and remains stuck in place. Later, as the mast continues its descent, the section breaks free and drops to the stops of the next larger mast section. Because this condition has been experienced in operating plants, the distance that a mast section may drop is limited by a load sensor that stops the descent of the mast if the full load of each mast section is not transferred as the mast is extended. Thus, the challenge is to provide a bearing design that never sticks but has zero clearance because bearing clearance introduces a non-repeatable position error.

There are many position errors that must be considered in the design of a refueling machine and at least one error that cannot be corrected with the absolute positioning concept is the real variable position of the fuel in the core relative to the X-Y position indication given by the encoder. To achieve the needed repeatable position accuracy in the range of ±15–20 mm at the core level in the reactor at a depth of about 17 m below the refueling floor is a design challenge and expensive.

Relative to European designs, U.S. refueling machines are lighter, but the position error is much larger. This is the result of several factors, some of which are: (1) the structure is very flexible; (2) the drive train has excessive backlash; and (3) the telescoping mast has large clearances between each of the telescoping sections. Although some of these problems have been corrected by retrofits at a few plants, the U.S. refueling platform cannot be used for automation because a system position location is not repeatable with sufficient accuracy.

Applying the absolute positioning method to the motion of two fuel assemblies with each traverse of the refueling machine is difficult because of the added weight of a second mast/grapple and corresponding increase of the structural deflection. Also, if the masts cannot be controlled independently in X and Y directions, the full potential of dual fuel motion will not be realized. For the conventional refueling machine, providing independent position control for two grapples in X and Y directions increases the machine's weight and design complexity to a point that is not considered a viable option.

SUMMARY OF THE INVENTION

Since moving fuel is highly repetitive, it is an ideal target for automation. However, the conventional refueling machine was not designed to be automated. TO attempt to automate the machine by simply adding new controls will not increase the performance, safety or reliability. One very important reason is, the absolute positioning approach used in current European designs results in very massive structures and a very heavy telescoping mast, both of which must be accurately positioned. The new design objective must be in exactly the opposite direction, i.e., to minimize the mass of the components that are position controlled.

The refueling machine concept of the present invention achieves automatic positioning without the strong emphasis on minimizing deflection and machining accuracy, each of which results in heavy expensive equipment, This new refueling concept can be applied to reduce the time required for refueling, to reduce dependence on operator skill, to decrease operator exposure, and to increase safety and reliability during refueling.

The new design objective is achieved by applying object and character recognition techniques to enable relative position control rather than absolute position control. This change facilitates a reduction in weight of all components and thus increases position reliability. An important consequence of the very substantial reduction in the weight of the refueling mast is, two fully automated robotic arms may be used to move two fuel assemblies simultaneously with increased position reliability of both, thereby speeding up the movement of fuel. In addition, it is a central objective of the present invention to apply machine vision for position control at the core level rather than indirectly from position indicators at the refueling floor level.

Thus, in accordance with the preferred embodiments of the invention, the refueling machine comprises two robotic arms on a moving platform, a flexible mast, a pendant with optical object recognition, and a compatible relative positioning control system. The components are compact and lightweight, which facilitates the retrofitting of existing refueling bridges.

The new relative positioning pendant concept utilizes recent developments in object and character recognition technology that is integrated with a computer-based control system. This system will achieve repeatable position accuracy of the grapple at the fuel level in the core, enabling the control system to provide the operator with a selection of manual, semi-automatic or fully automatic modes of fuel transfer. The concept can also be easily applied to moving one fuel assembly or to simultaneous movement of two or more fuel assemblies.

The pendant, which carries the end effector (e.g., a fuel grapple), is at the heart of the new design. Two television cameras are mounted on or inside the pendant on opposite sides thereof. The cameras are in a fixed location but with a variable focal length. The control system is able to recognize an encoded geometric shape and compare the shape to the visual image developed by the camera. The position difference in the X-Y plane is determined by the control system and a positioning robot, to which the pendant cable is attached, is moved to the defined location.

Normally a problem with moving a load hanging on the end of a cable is its tendency to swing after the positioning robot has stopped. This tendency is eliminated in accordance with the preferred embodiment of the invention by a smart position control system. Depending on the programmed acceleration and deceleration, the exact amount of over control necessary to eliminate swinging is calculated by the control system and becomes part of the motion control sequence.

A very lightweight mast, made of aluminum or polyethylene, is provided which assures the pendant cables remain in a single plane and provides resistance to rotation. The weight of this type of mast is estimated to be about $\frac{1}{10}$ of a conventional telescoping mast and does not require repeatable position accuracy. The telescoping mast in accordance with the invention only needs a predictable spring constant. Preferably, the upper end of the top segment of the telescoping mast is mounted to enable rotation of the mast about its longitudinal axis.

DETAILED DESCRIPTION OF THE PREFERRED EMBODIMENTS

Figures 1, 2:
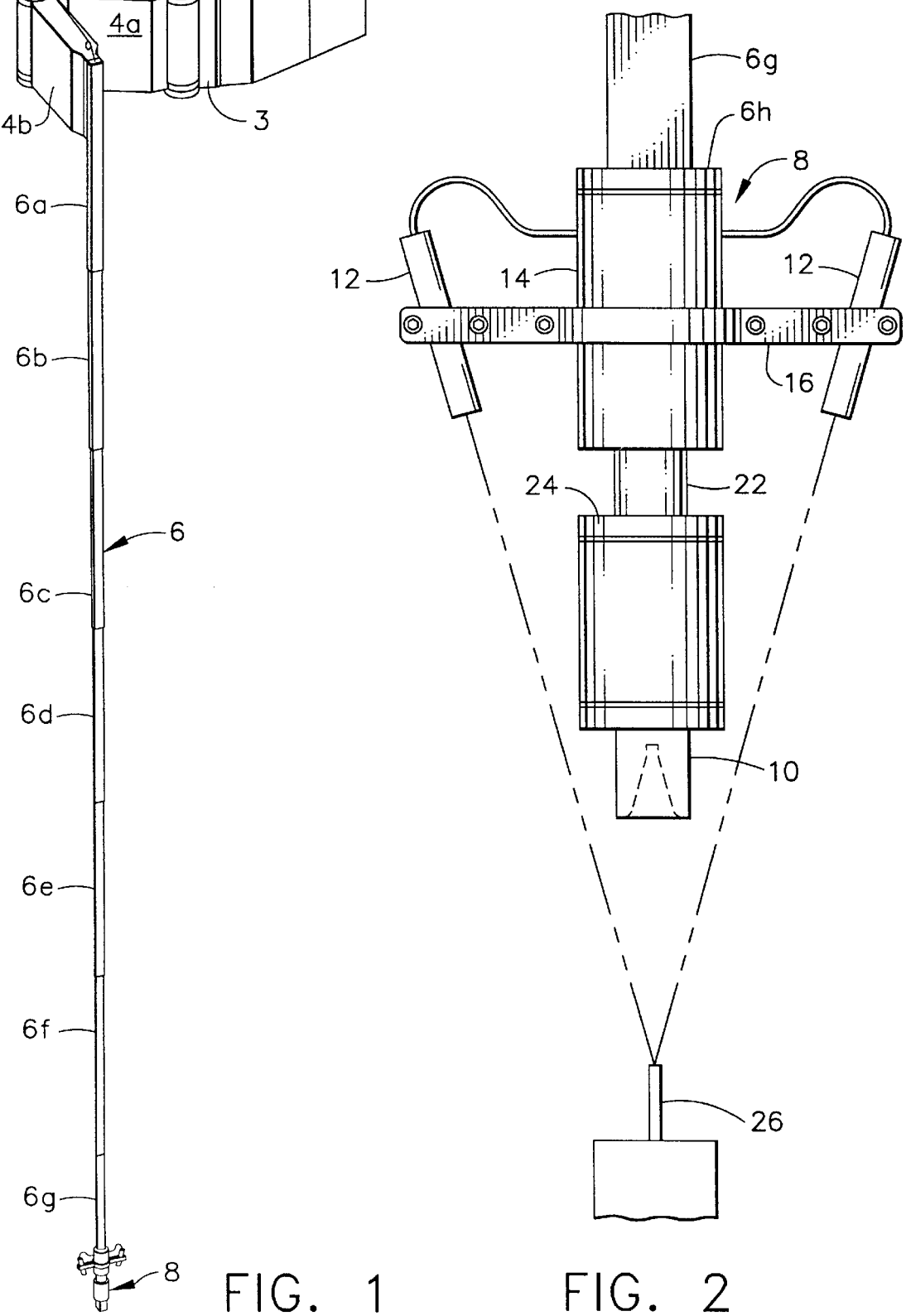
FIG. 1 is an isometric view of a six-element mast attached to a robotic arm in accordance with one preferred embodiment of the invention.
FIG. 2 is a side view of a pendant for grappling fuel bundle assemblies which can attached to the lower end of the telescoping mast of the present invention.
Figure 7:
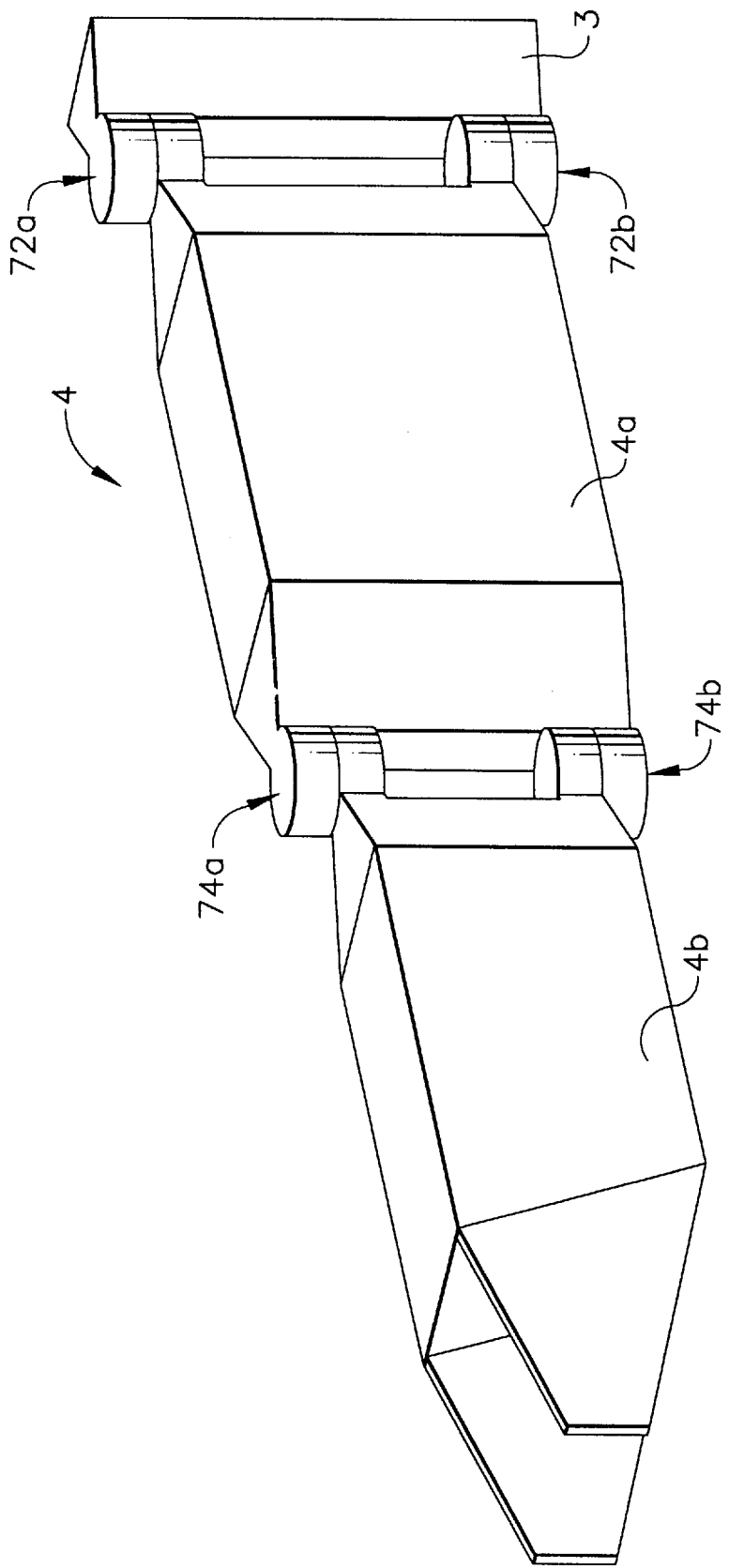
FIG. 7 is an isometric view of a robotic arm in accordance with a preferred embodiment of the invention.

A relative positioning refueling machine comprises a movable refueling bridge which supports the structure shown in FIG. 1. That structure comprises a support structure 2, a cantilever beam 3 having one end supported by the support structure 2, an articulated robotic arm 4 having one end connected to the cantilever beam 3, a telescoping mast 6 mounted on the other end of the robotic arm 4, and a pendant 8 mounted on the bottom end of mast 6. As shown in FIG. 7, the robotic arm 4 takes the form of an articulated boom comprising a first link 4a having one end which is pivotably coupled to the end of cantilever beam 3 via a pair of coaxial joints 72a and 72b, and a second link 4b having one end which is pivotably coupled to the other end of link 4a via a pair of coaxial joints 74c and 74d. The telescoping mast 6 is suspended from the other end of link 4b. The first pivot axis through joints 72a and 72b is vertical and parallel to the pivot axis through joints 74c and 74d. Thus, the links of each robotic arm 4 can rotate in a yaw direction only. The yawing of these links, in combination with translation of the refueling bridge 70 (see FIG. 8), provides the gross positioning of the end effector relative to the reactor component to be lifted.

Figure 11:
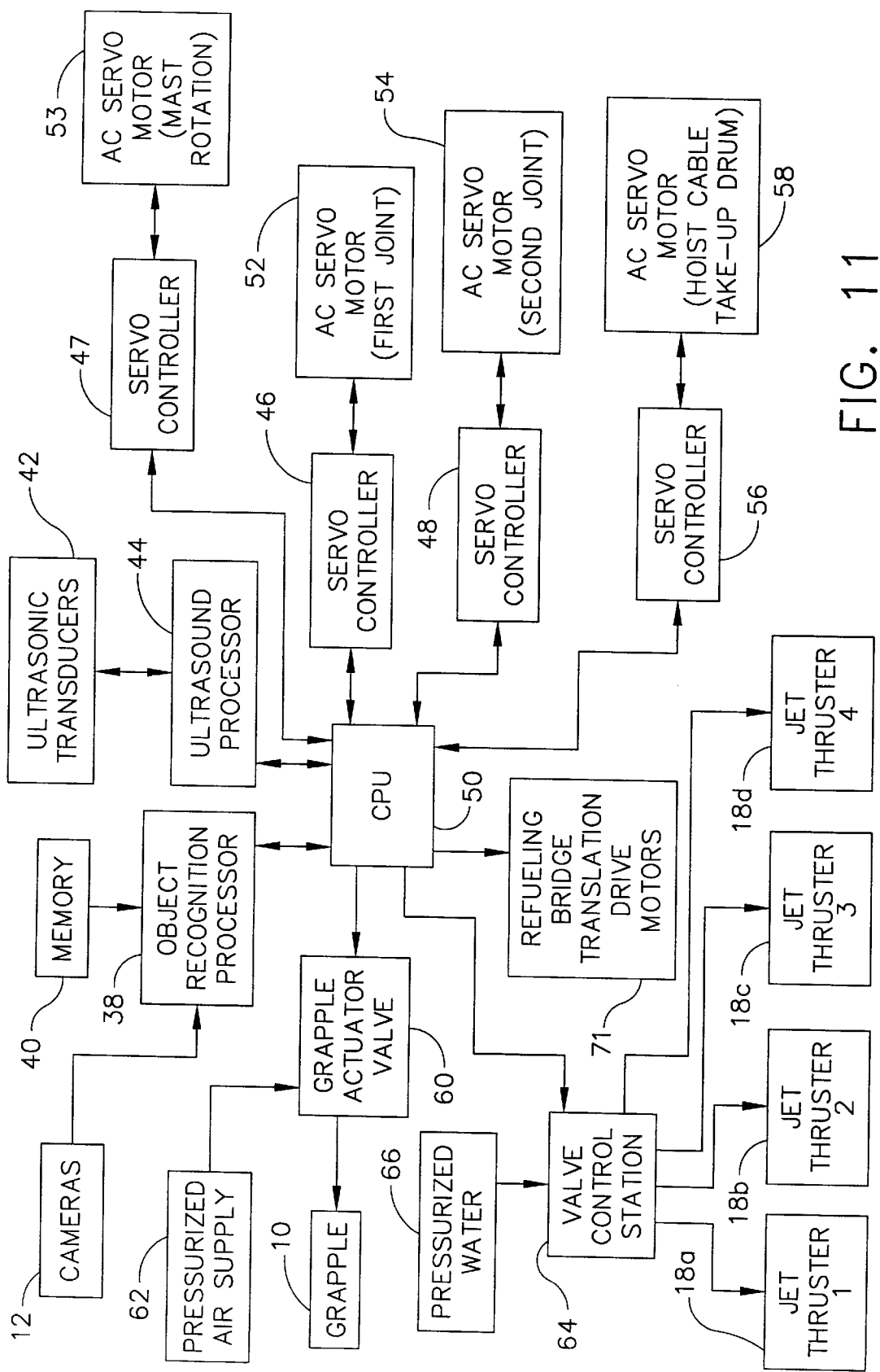
FIG. 11 is a block diagram of the system for controlling the positioning of an end effector relative to a fuel bundle assembly in accordance with the present invention.

Pivoting of link 4a relative to the cantilever beam 3 is controlled by a servo controller 46 (see FIG. 11) which drives an AC servo motor 52 coupled to a mechanical gear incorporated in joint 72a and an identical drive system coupled to a mechanical gear incorporated in joint 72b. These drive systems must be coupled so that the respective servo motors operate in synchronism. Similarly, pivoting of link 4b relative to link 4a is controlled by a servo controller 48 which drives an AC servo motor 54 coupled to a mechanical gear incorporated in joint 74a and an identical drive system coupled to a mechanical gear incorporated in joint 74b. The drive systems associated with joints 74a and 74b must be coupled so that the respective servo motors operate in synchronism. The servo controllers 46 and 48 receive control and data signals from a central processing unit 50.

The telescoping mast in accordance with the concept of the present invention is a very light, relatively flexible set of nested tubes, including fixed tube 6a and moving tubes 6b–6g (see FIG. 1). The tubes Gb–6g are slidable relative to fixed mast segment 6a and relative to each other. The number of slidable mast segments may be varied between three and ten depending on the design requirements for a specific application. Specifically, for any design of this type, the number of tubes needed depends on the retracted length, the overlap between tubes and the extended length. The level of flexibility and position repeatability when retracting and extending the tubes depends on tube straightness, clearance between the tubes, overlap and spacer design. More tubes generally means a greater vulnerability to manufacturing tolerances of the individual tubes, length of the overlap and the spacer design for a given position accuracy. This vulnerability was particularly important for conventional designs (the system used in most currently operating reactors) in which overall position accuracy is directly dependant on the accuracy of the telescoping mast. The consequence of this dependence was a very expensive, very heavy, accurately machined set of nested stainless steel tubes.

The topmost mast segment 6a is attached via a gimbal mounting (not shown) to the distal end of link 4b. The gimbal mounting allows rotation of mast segment 6a about its own longitudinal axis. Mast rotation is controlled by a servo controller 47 (see FIG. 11), which drives an AC servo motor 53 coupled to a mechanical gear (not shown). Mast segment 6a is fixed in the sense that it cannot translate relative to the arm link 4b.

Referring to FIG. 2, the pendant 8 has a cylinder 22 with a flange 24 for attaching the end effector, e.g., a fuel grapple 10 or a control rod grapple (not shown). The cylinder 22, which extends inside the pendant housing, is optionally designed to rotate about 360° with angular position control, in which case the telescopic mast segment 6a need not be rotatable about its longitudinal axis. The flanged cylinder 22 is also spring loaded in the vertical axis to prevent transmission to the mast of the full force produced when the fuel grapple 10 impacts the bail 26 of the fuel bundle assembly. The mast 6 further comprises a removable attachment 6h (see FIG. 2) to the pendant 8 and a removable attachment (not shown) to robotic arm link 4b.

Figure 4:
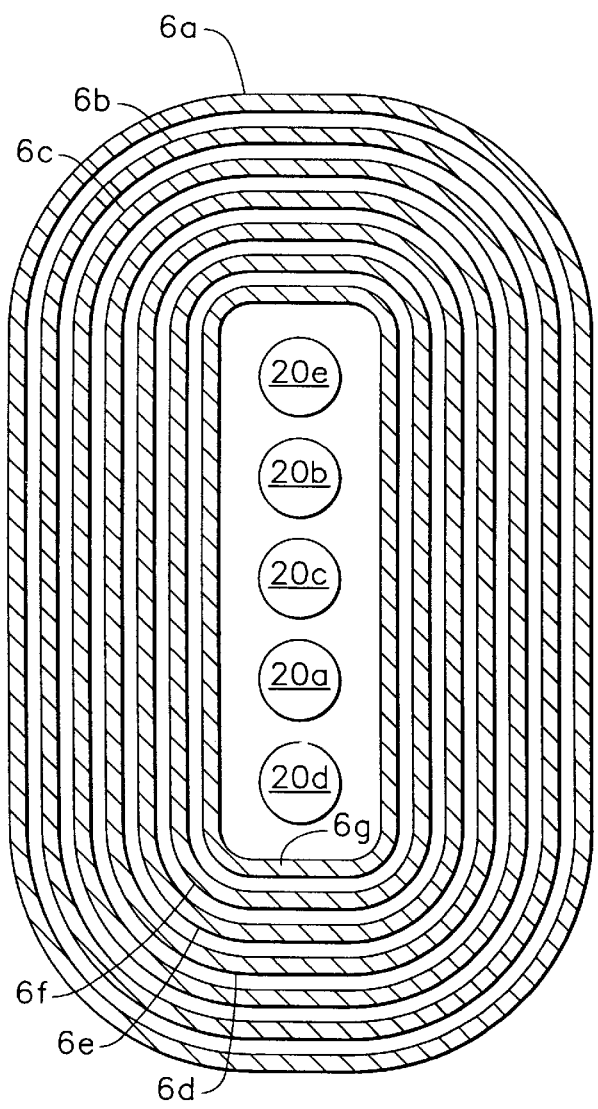
FIG. 4 is a horizontal cross-sectional view of the six-element telescoping mast shown in FIG. 1.

The pendant and its load are supported by two wire ropes or hoist cables 20a and 20b (see FIG. 4) attached to the innermost mast segment. The pendant 8 is raised and lowered by respectively winding and unwinding the hoist cables using a hoist cable takeup drum (not shown). Each hoist cable is designed to carry the full load of the device. The weight of the pendant is sufficient to cause the lightweight telescoping mast 6 to hang in a vertical position. The mast 6 acts as a shroud for the hoist cables 20a, 20b, the air supply hose 20c for actuating the fuel grapple 10, the signal cable 20d from the ultrasonic transducers, and the power and control cable 20e to the ultrasonic transducers, as shown in FIG. 4.

The present invention applies object and character recognition, commonly referred to as machine vision. The software and hardware for control systems integrating machine vision are commercially available. The invention applies machine vision in the context of underwater operation of the pendant in a radiation field.

To improve performance and reduce cost, the pendant incorporates compact underwater cameras 12 with lights and ultrasonic transducers 42 for position verification and collision avoidance. The ultrasonic transducers 42 can operate alternatingly in transmission and receive modes in conventional fashion. The time of arrival of the return or echo signals received by the ultrasonic transducers indicates the distance between the transducer and the reflecting object. This data is used by the ultrasound processor 44 to provide a signal indicating the coarse position of the grapple 10 (or other end effector) relative to the target fuel bail 26 (see FIG. 2) to be grappled. The coarse position information is relayed to the central processing unit 50, which controls the servo motors 52, 54 to decrease the distance between the grapple 10 and the fuel bail 26.

Figure 3:
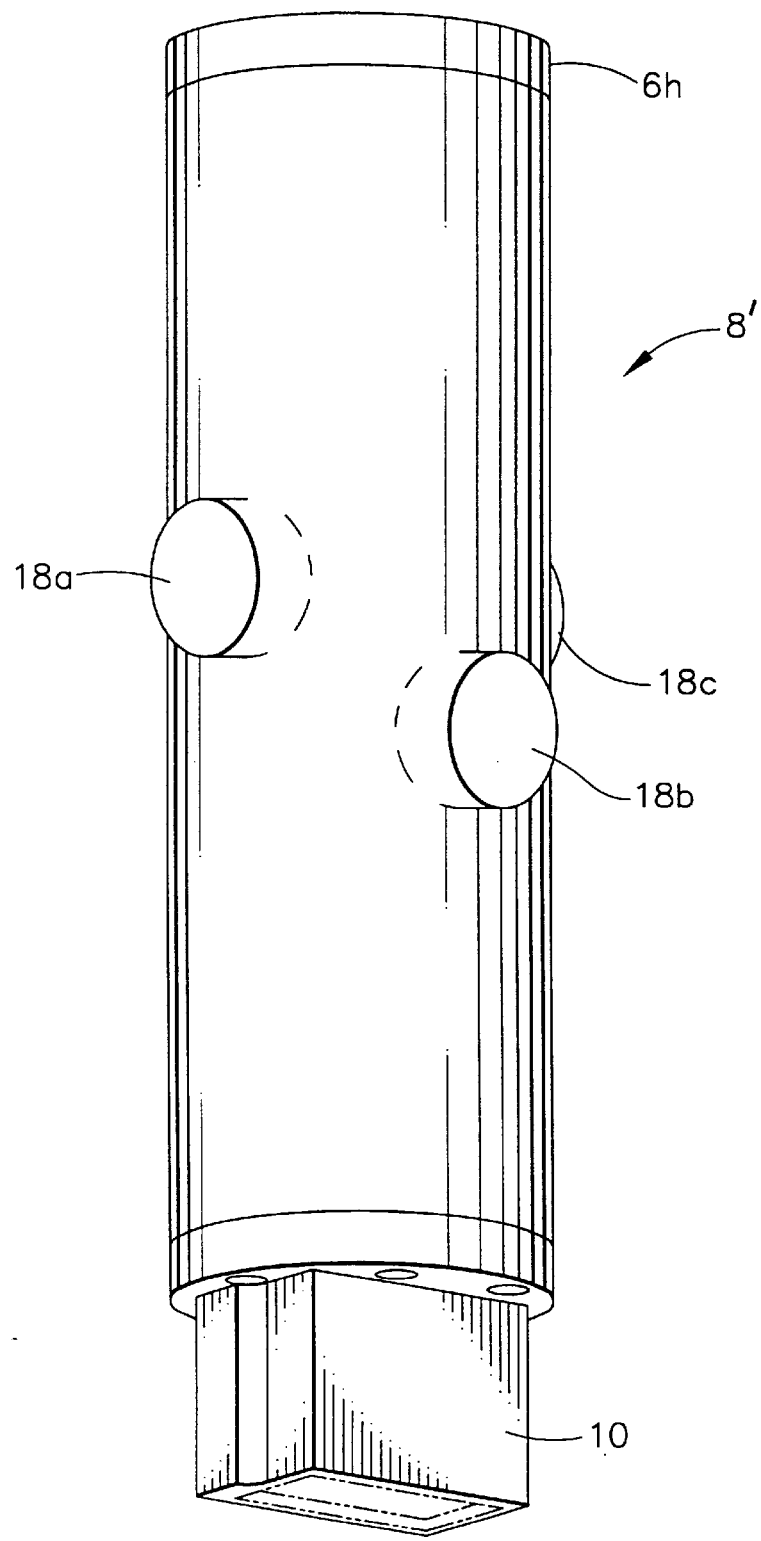
FIG. 3 is an isometric view of a pendant in accordance with an alternative preferred embodiment of the invention.

The cameras 12 can be mounted externally on a cylindrical body 14 of pendant 8 using holders 16, as shown in FIG. 2. Alternatively, the pendant 8' has two cameras (not shown) which are located inside cylindrical body 14', as shown in FIG. 3. The images from the cameras are digitized by object recognition processor 38 (see FIG. 11) and compared to images prestored in memory 40 to determine the angular position and the fine position of the grapple 10 (or other end effector) relative to the fuel bail 26.

In response to the fine position information feedback, the central processing unit 50 causes the robotic arm 4 to articulate until the grapple is over the bail. Then, based on the angular position information from the object recognition processor, computer 50 causes the mast 6 to be rotated, via servo controller 47 and AC servo motor 53 (see FIG. 11), until the grapple and bail are aligned. Then computer 50 causes the servo controller 56 to activate the AC servo motor 58, which drives rotation of the hoist cable takeup drum (not shown) in the unwinding direction so that the grapple is lowered onto the bail. Finally, computer 50 opens the grapple actuator valve 60 to supply pressurized air from the pressurized air supply 62 to the air-actuated grapple 10, thereby coupling the grapple to the bail. The fuel bundle assembly attached to the grappled bail can then be elevated under the control of computer 50 by driving the hoist cable takeup drum to rotate in the windup direction.

In accordance with an alternative preferred embodiment, the fine position of the end effector relative to the target can be adjusted using waterjet thrusters. This is possible because the mast is designed to flex laterally in its elongated state. Four waterjet thrusters 18a–18d (see FIG. 11) are spaced at 90° intervals around the outer circumference of body 14' of pendant 8' (see FIG. 3) to provide fine motion position control in the X-Y plane. The waterjet thrusters are selectively coupled to a source 66 of high-pressure water by activation of valves in the water control station 64 under the control of central processing unit 50. The thrusters are utilized in the position control scheme as follows.

The articulation of robotic arm 4 (see FIG. 7) and translation of the refueling bridge 70 (see FIG. 8) are controlled by the central processing unit 50 (see FIG. 11) via arm link servo motors 52 and 54 and via refueling machine drive motors 71, respectively. This provides the needed high-speed gross positioning of the pendant 8' (see FIG. 3) for grappling and moving fuel. The gross positioning is expected to be accurate to within +100 mm utilizing computer-resident position tables. After reaching the gross relative position, as determined by ultrasonic detection, the refueling bridge 70, with mount 2 supported thereon, is temporarily locked in place. Then, as the pendant is being lowered, the cameras 12 provide the imaging necessary for software to determine the location of the pendant relative to the position required for grappling the fuel (or other core components). In this phase, position control is passed to a machine vision component of the control system. This intermediate positioning process is expected to be accurate to within about 35 10 mm at a distance ranging from 4000 to 1000 mm above the level of the fuel bail 26 (see FIG. 2) to be grappled. The speed of descent of the pendant 8' is gradually reduced and the thrusters 18a–18d (see FIGS. 3 and 11) position the pendant 8' within about ±2 mm of the true position for grappling at distances ranging from 1000 to 100 mm above the fuel bail. The telescoping mast 6 is sufficiently flexible to permit an initial 20 mm motion. However, as the pendant 8' is slowly lowered the last 1000 mm, the robotic arm 4 is then moved at the level of the top of the mast to the exact X-Y position above the pendant while the pendant's position is maintained by the thrusters.

Angular position is easily achieved at the top of the telescoping mast 6 and the thrusters are used, as described above, to assure fine motion position control. The use of thrusters makes possible a very light flexible plastic telescoping mast design which is used only as a guide for the support cables and pendant umbilical cords.

The mast should not inhibit the ability of the pendant to define its correct location over the fuel to be grappled and to be positioned by the robotic arm from above. This suggests that the mast need not be stiff but it should have a relatively fixed spring constant, i.e. it should have very little lost motion as it is extended or retracted. Although some lost motion could be accepted, excessive looseness could result in hunting which would be an unwelcome time delay in grappling fuel. with the addition of thrusters to the pendant, the stiffness requirements for the telescoping tubes becomes a minor consideration. Nevertheless, fewer tubes in the telescoping mast is desirable because the assembly has fewer parts, is lighter and less expensive. The reduced weight of each mast segment eliminates the concern for a mast segment being dropped.

Figure 5:
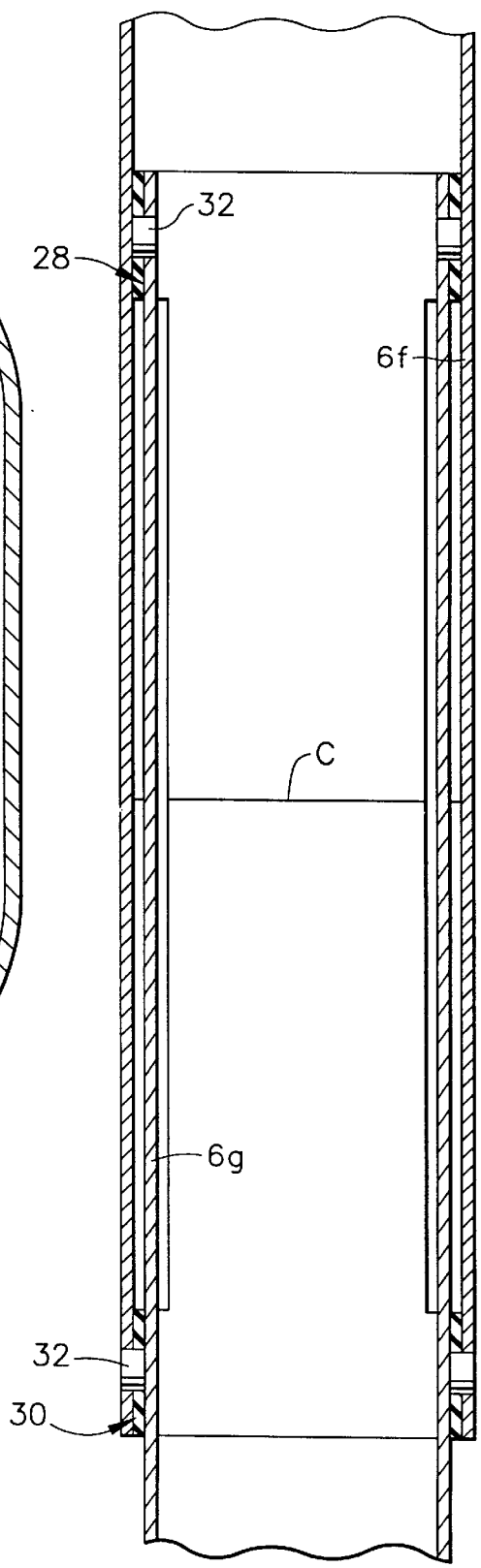
FIG. 5 is a vertical cross-sectional view of the joint of the lowest two nested tubes of a telescoping mast in accordance with the present invention, showing the location of the spacer.

A vertical cross section of the joint of the two lowest nested mast segments 6f and 6g having a spacer in accordance with the preferred embodiment of the instant is shown in FIG 5. It should be understood that the joint of each pair of nested mast segments has a similar spacer arrangement. Each mast segment is a tube having a cross-sectional shape similar to a rectangle with rounded corners. Other shapes, such as an ellipse, could also be used. The spacer assemblies 28 and 30 are located between the tube elements 6f and 6g at the joint thereof. The upper spacer assembly 28 is attached to the top of tube element 6g and extends downward between tube elements 6f and 6g; the lower spacer assembly 30 is attached to the bottom of tube 6f and extends upward between the tube elements. The spacer assemblies 28 and 30 in conjunction act as a tube guide, as a damper if the tube element 6g sticks and subsequently drops, and as a stop for downward displacement of tube element 6g relative to tube element 6f. The location of the spacer assemblies is shown in FIG. 5, but the structure of the spacer assemblies is not shown in detail. Spacer assemblies 28 and 30 are preferably made of molded plastic, e.g., polyethylene. The upper and lower spacer assemblies maintain a predetermined spacing between the relatively inner tube segment 6g and the relatively outer tube segments 6f during relative longitudinal displacement of those segments.

The lower spacer assembly 30 (see FIG. 6) comprises a lower spacer ring 30a and a plurality of flexible members 30b–30e connected at one end to lower spacer ring 30a and extending upward. Similarly, the upper spacer assembly comprises a lower spacer ring and a plurality of flexible members connected at one end to the upper spacer ring and extending downward. Lower spacer ring 30a is used to attach the lower spacer assembly to the bottom end of the relatively outer telescoping tube, e.g., tube segment 6f in FIG. 5. Similarly, the upper spacer ring is used to attach upper spacer assembly 28 to the top end of the relatively inner telescoping tube, e.g., tube segment 6g. Between each successively larger tube is an upper and a lower spacer assembly. Thus, for the six-segment mast shown in FIG. 1, there are a total of 12 spacer assemblies.

Figure 6:
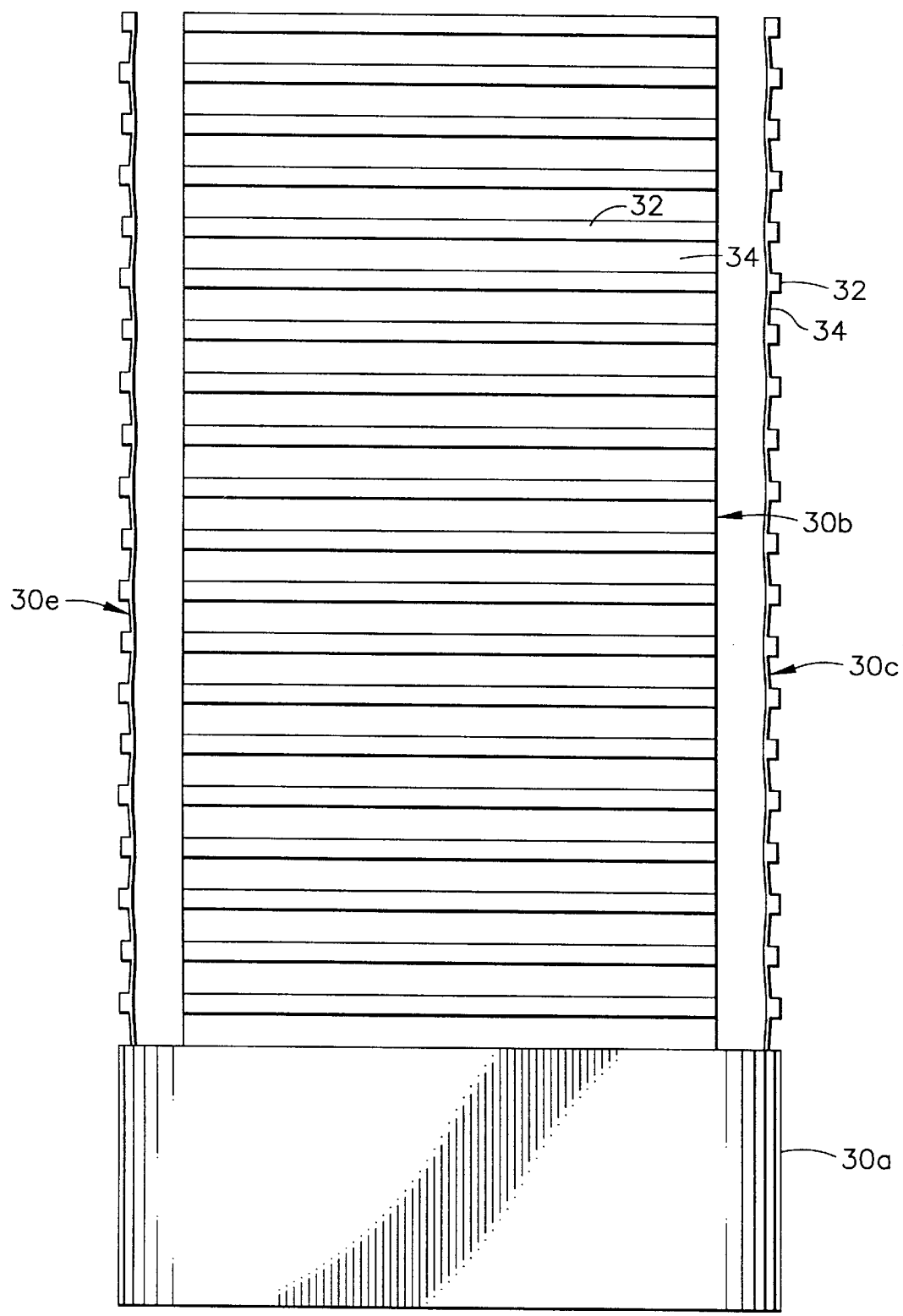
FIG. 6 is a front view of a spacer assembly in accordance with one preferred embodiment of the invention.

Each of the flexible members (e.g., 30b–30e) comprises a multiplicity of corrugations, shown in detail in FIG. 6. Each corrugated flexible member has a multiplicity of generally parallel elongated spacer blocks 32 connected in series by a multiplicity of flexible beams 34. Each block 32 has a rectangular cross section having a width equal to the width of the spacer ring 30a, which width is equal to the desired spacing between adjacent nested tube segments. Referring to FIG. 5, the distal ends of the flexible members of upper spacer assembly 28 contact the corresponding distal ends of respective ones of flexible members 30b–30e of lower spacer assembly 30 at contact plane C, for example, when tube segment 6g is in an extended position relative to tube segment 6f. Bending of the flexible beams 34 during compression of the spacer assemblies provides damping of the force produced upon impact when one tube segment drops relative to the next larger tube segment in which the one tube segment is nested. This can occur after the one tube segment has been stuck and then slips relative to the next larger tube segment. To facilitate bending of beams 34 in response to compression of the corrugated members in a longitudinal direction, the beams 34 are connected to the rectangular blocks 32 at a slight oblique angle relative to the blocks. One side of each block contacts the inner wall surface of the outer telescoping tube and the other side contacts the outer wall surface of the inner telescoping tube. By selecting the beam thickness and distance between the blocks, an optimum force between the telescoping tube segments can be developed.

The systems currently in operation in Europe and Japan have been designed to limit deflection and are therefore very stiff, resulting in a high natural frequency. In contrast, the refueling machine of the present invention has been designed to permit deflection as a means to decrease size, weight and cost and to improve control system responsiveness. The result to be expected is a much lower natural frequency than current designs.

In accordance with the preferred embodiments of the refueling machine, two fixed pedestals (each pedestal being similar to the support structure 2 shown in FIG. 1) are mounted on a refueling bridge that travels linearly on a pair of tracks via rolling wheels. A respective robotic arm, constructed as shown in FIG. 7, is attached to each pedestal. This approach takes advantage of the potential for reducing the size and weight of the moving structure in order to decrease its cost and facilitate decreasing fuel transport time.

Utilizing the position control scheme outlined above permits the structure to be more flexible because positioning the grapple over the fuel is very loosely related to the rigidity of the structure, i.e., the position error of the structure may be as large as +100 mm. In addition, the total weight of conventional mast, trolley and related equipment is expected to be slightly heavier than that of two robotic arms, two masts and hoists with fuel. This result is possible due to the very large reduction in weight of the mast and because the entire control system will be located in a specially designed control room, not on the refueling machine.

Figure 8:
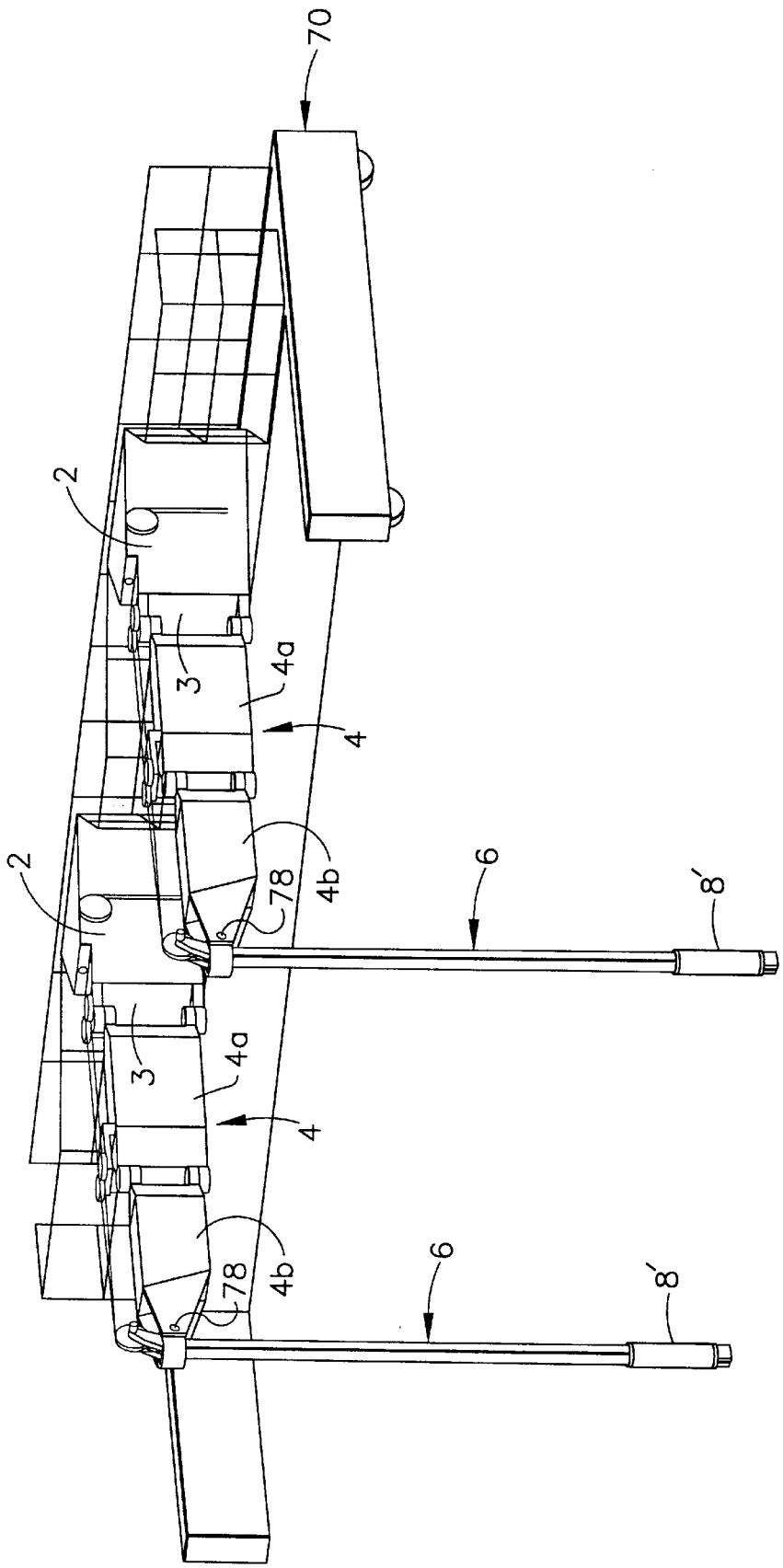
FIG. 8 is an isometric view of a refueling machine having a low-profile structure and a raised robotic arm mount in accordance with a preferred embodiment of the invention.
Figure 9:
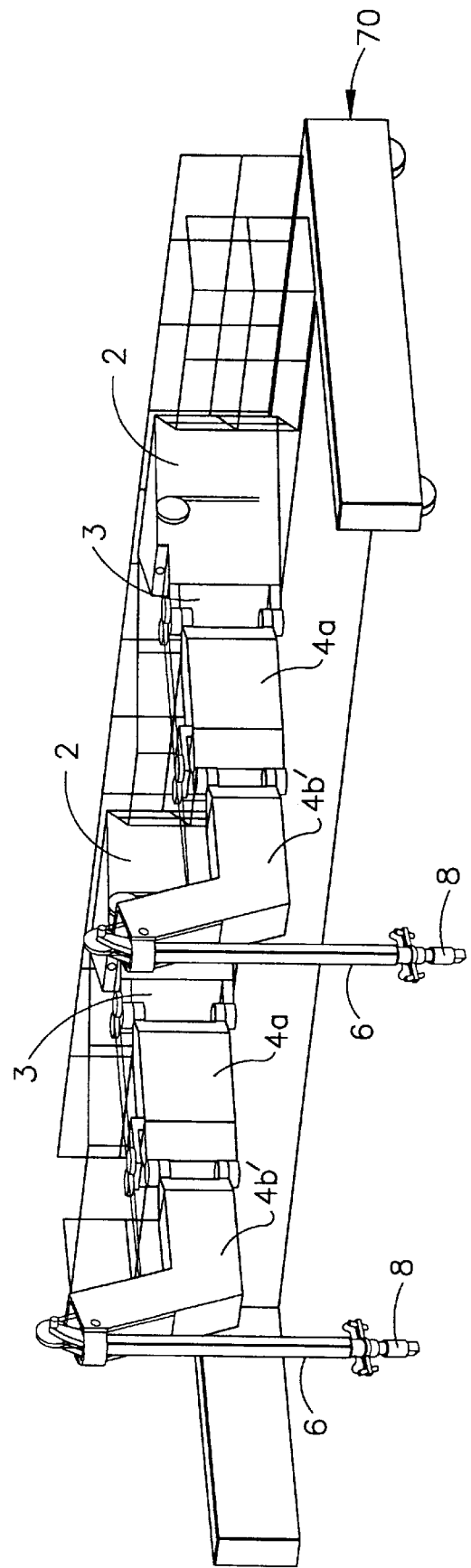
FIG. 9 is an isometric view of a refueling machine having two robotic arms, each arm having an upturned link which elevates the telescoping mast in accordance with a preferred embodiment of the invention.
Figure 10:
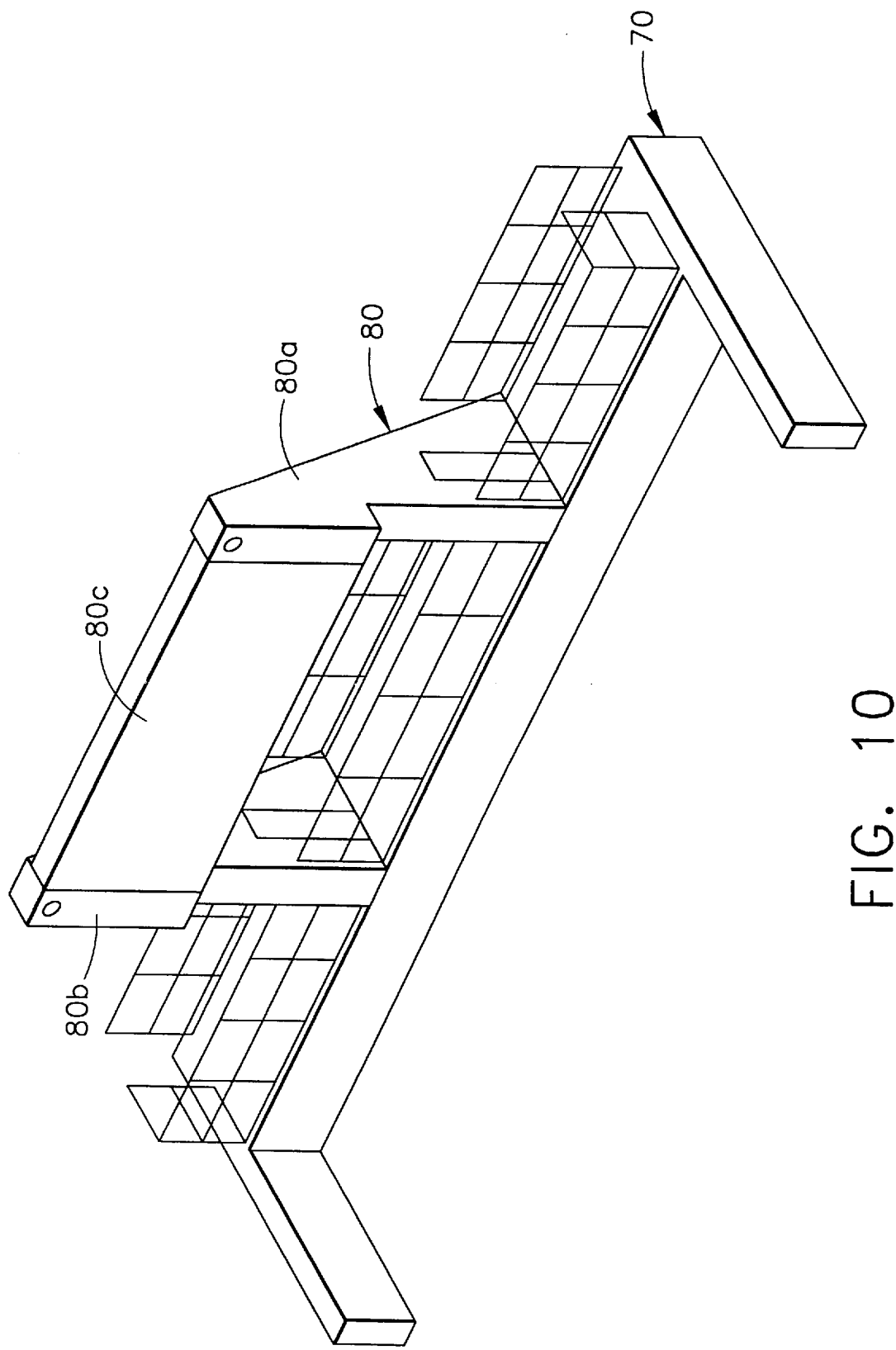
FIG. 10 is an isometric view of a high-profile refueling bridge in accordance with a preferred embodiment of the invention.

In accordance with a preferred embodiment of the invention, the refueling bridge is designed to have a low-profile robotic arm mount, as seen in FIGS. 8 and 9. This bridge is expected to be less than 30% of the weight of a typical conventional refueling platform structure, not including the trolley. This low-profile structure was applied in two versions which differ only by the mounting height above the refueling floor of the top of the telescoping mast. The low-profile refueling machine design shown in FIG. 8 requires a 10-segment mast. A fully retracted mast 6 is pivotable about a pivot 78 mounted on the distal end of arm link 4b. The pivot 78 is arranged generally horizontal to allow the retracted mast to be pivoted from a vertical to a horizontal position. An auxiliary hoist is required to rotate the mast to the horizontal position. In the horizontal position, maintenance personnel have access to the bottom end of the mast for the purpose of changing end effectors. The low-profile refueling machine design shown in FIG. 9 requires an 11-segment mast, but the end effectors can be changed without rotating the mast. Where sufficent height in the reactor building is available, a high-profile version of the refueling bridge, shown in FIG. 10, can be utilized, in which a pair of fixed pedestals 80a and 80b support a cross member 80c of a high-profile robotic arm mount 80.

The control system in accordance with the invention is capable of three modes of operation for moving fuel: fully automatic; semi-automatic, i.e., automatic with interrupts for operator verification; and manual.

In the fully automatic mode, the control system is capable of automatically executing a large number of position commands in sequence, e.g., unload or reload an entire core, without operator intervention. For example, when the operator starts the system, a fuel assembly is automatically grappled and moved from a specified position in the core to the spent fuel storage pool along the path. The system automatically inserts the fuel in a spent fuel storage pool location, releases it, returns to the reactor core and grapples the next specified fuel assembly. The process is continued until the predefined sequence is completed. The predefined sequence may be established or altered in the teach mode. The teach mode permits the operator to manually step through a sequence and later the machine will repeat that exact sequence. This may be accomplished physically by moving the grapple from the platform through a sequence manually or by graphic simulation.

In the semi-automatic mode the sequence is the same as described above except that the automatic process stops at predetermined steps and control is passed to the operator for action. For example, the system may be set to have the mast stop above the fuel to be grappled for the operator to verify the position and number of the fuel assembly. When the operator is satisfied, the operator returns the control to automatic and the machine performs the next step. The control system is designed to permit the operator to select specific interrupts.

In the manual mode, the operator selects a specific position and directs the platform and mast to move to that position. Any coordinate or combination of coordinates may be entered. The operator does not control the position of the refueling machine or its mast directly; rather a position instruction or position instruction sequence is given to the control system, which then directs the motion of the platform.

In all modes of operation, the control system includes forbidden locations and sequences that prevent interference. For reliability, this feature is accomplished by two independent methods. First, a look-up table (or other memory-resident method) in the control system provides XYZ positions that the mast may take, and second, a direct proximity-measuring device, e.g., an ultrasonic transducer, on the pendant verifies the distance to an obstacle, e.g., by measuring the time interval between transmission of an ultrasound pulse and reception of its reflection from the obstacle.

The foregoing preferred embodiments have been disclosed for the purpose of illustration. Other variations and modifications will be apparent to persons skilled in the arts of machine vision and robotics. For example, any suitable system for driving the yawing of the links of the articulated boom can be used. Further, it will be apparent to persons skilled in the art that propeller-driven thrusters can be substituted f or the water jet thrusters. All such variations and modifications are intended to be encompassed by the claims set forth hereinafter.

We claim:

1. A refueling machine for refueling a nuclear reactor, comprising a refueling bridge, a first articulated arm having first and second ends, a first support structure mounted on said refueling bridge and connected to said first end of said first articulated arm, a first telescoping mast suspended from said second end of said first articulated arm, a pendant mounted on a bottom end of said telescoping mast, and an end effector coupled to said pendant, wherein said articulated arm is movable relative to said refueling bridge in a horizontal plane only.

2. The refueling machine as defined in claim 1, wherein said first articulated arm comprises first and second links, said first link of said first articulated arm being pivotable at a first joint with said first support structure, said second link of said first articulated arm being pivotable at a second joint with said first link of said first articulated arm and said first telescoping mast being suspended from said second link of said first articulated arm, said first and second joints each having a vertical axis of rotation.

3. The refueling machine as defined in claim 1, further comprising a second articulated arm having first and second ends, a second support structure mounted on said refueling bridge and connected to said first end of said second articulated arm, and a second telescoping mast suspended from said second end of said second articulated arm.

4. The refueling machine as defined in claim 2, wherein said first telescoping mast is pivotable relative to said second link of said first articulated arm about a horizontal axis.

5. The refueling machine as defined in claim 1, wherein said end effector comprises an air-actuated grapple.

6. The refueling machine as defined in claim 1, wherein said telescoping mast is rotatable relative to said second link of said first articulated arm about a longitudinal axis.

7. The refueling machine as defined in claim 1, wherein said pendant is rotatable relative to said telescoping mast about a longitudinal axis.

8. The refueling machine as defined in claim 1, further comprising an ultrasonic transducer mounted on said pendant.

9. The refueling machine as defined in claim 1, further comprising a camera mounted on said pendant and object recognition means for comparing an image from said camera with a pre-stored image.

10. The refueling machine as defined in claim 1, further comprising a waterjet thruster mounted on said pendant and valve control means for controlling the supply of high-pressure water to said waterjet thruster, wherein said telescoping mast is designed to flex laterally in response to thrust applied by said waterjet thruster.

11. A refueling machine for refueling a nuclear reactor, comprising a refueling bridge, a first beam having first and second ends, a support structure mounted on said refueling bridge and having a first joint by which said first end of said first beam is coupled to said support structure, a telescoping mast suspended from said second end of said first beam, a pendant mounted on a bottom end of said telescoping mast, and an end effector coupled to said pendant, wherein said first beam is rotatable about an axis of rotation of said first joint and has no other degrees of freedom relative to said first joint.

12. The refueling machine as defined in claim 11, wherein said support structure comprises:

cantilever beam having first and second ends, said first end of said cantilever beam being mounted on said refueling bridge; and a second beam having a first end coupled to said second end of said cantilever beam by a second joint and a second end coupled to said first end of said first beam by said first joint, wherein said second beam is rotatable about an axis of rotation of said second joint and has no other degrees of freedom relative to said second joint.

13. The refueling machine as defined in claim 11, wherein said telescoping mast is pivotable relative to said second end of said first beam about a horizontal axis.

14. The refueling machine as defined in claim 11, wherein said telescoping mast is rotatable relative to said second end of said first beam about a longitudinal axis.

15. The refueling machine as defined in claim 11, wherein said pendant is rotatable relative to said telescoping mast about a longitudinal axis.

16. The refueling machine as defined in claim 11, further comprising an ultrasonic transducer mounted on said pendant.

17. The refueling machine as defined in claim 11, further comprising a camera mounted on said pendant and object recognition means for comparing an image from said camera with a pre-stored image.

18. The refueling machine as defined in claim 11, further comprising a waterjet thruster mounted on said pendant and valve control means for controlling the supply of high-pressure water to said waterjet thruster, wherein said telescoping mast is designed to flex laterally in response to thrust applied by said waterjet thruster.

* * * * *